(12) United States Patent
Li et al.

(10) Patent No.: US 8,023,594 B1
(45) Date of Patent: Sep. 20, 2011

(54) ASYNCHRONOUS BIPHASE MARK SIGNAL RECEIVERS AND METHODS OF OPERATING SAME

(75) Inventors: Qi Li, Shanghai (CN); Xiaoqian Zhang, Shanghai (CN); Zhiyong Guan, Shanghai (CN)

(73) Assignee: Integrated Device Technology, inc., San Jose, CA (US)

( * ) Notice: Subject to any disclaimer, the term of this patent is extended or adjusted under 35 U.S.C. 154(b) by 683 days.

(21) Appl. No.: 12/171,612

(22) Filed: Jul. 11, 2008

(51) Int. Cl.
*G03B 41/00* (2006.01)
(52) U.S. Cl. .......................... 375/340; 375/342; 375/354
(58) Field of Classification Search ................ 375/324, 375/333, 340, 342, 354; 327/1, 18, 31
See application file for complete search history.

(56) References Cited

U.S. PATENT DOCUMENTS

| | | | |
|---|---|---|---|
| 5,446,765 A | 8/1995 | Leger | |
| 5,889,820 A * | 3/1999 | Adams | ........................... 375/282 |
| 6,757,341 B1 * | 6/2004 | Ema et al. | ...................... 375/333 |
| 6,768,433 B1 | 7/2004 | Toth et al. | |
| 7,136,446 B2 | 11/2006 | Schmidt | |
| 7,310,390 B2 | 12/2007 | Bertram | |
| 7,539,241 B1 * | 5/2009 | Dick | ............................. 375/152 |
| 7,702,005 B2 * | 4/2010 | Lin et al. | ....................... 375/220 |
| 2003/0012323 A1 | 1/2003 | Schmidt | |
| 2007/0047638 A1 | 3/2007 | Lam et al. | |

OTHER PUBLICATIONS

Sanchez et al., "Overview of Digital Audio Interface Data Structures," Cirrus Logic, Inc., Feb. 28, 1998, 8 pages.

* cited by examiner

*Primary Examiner* — Jean B Corrielus
(74) *Attorney, Agent, or Firm* — Myers, Bigel, et al.

(57) ABSTRACT

A biphase mark signal receiver includes a data and clock recovery circuit. The data recovery circuit may include a coarse recovery stage and a fine recovery stage. The coarse recovery stage is configured to detect repeating occurrences of a first preamble (e.g., Y-preamble) within a biphase encoded data stream received by the data recovery circuit. The fine recovery stage is configured to generate a recovered data stream, in response to estimating a plurality of timing decision points (e.g., 3UI, 2UI and 1UI) from the repeating occurrences of the first preamble detected by the coarse recovery stage.

20 Claims, 5 Drawing Sheets

US 8,023,594 B1

ASYNCHRONOUS BIPHASE MARK SIGNAL RECEIVERS AND METHODS OF OPERATING SAME

FIELD OF THE INVENTION

The present invention relates to integrated circuit devices and, more particularly, to clock recovery circuits and methods of operating same.

BACKGROUND OF THE INVENTION

A serial bit stream may be transmitted with biphase mark encoding to minimize the DC component within the stream and to enable clock recovery therefrom. As will be understood by those skilled in the art, biphase mark encoding is employed by the International Engineering Consortium (IEC) 60958 standard, the AES3 digital audio standard and the Sony/Philips Digital Interconnect Format (SPDIF) standard, which is typically used for transporting stereo digital audio signals on PC audio cards, CD players, DVD players, car audio systems and other systems that transmit or receive stereo digital audio, for example.

As illustrated by FIG. 1, after biphase mark encoding, logic 1 data values are transmitted with center transitions, but logic 0 data values are not. Biphase mark bit streams also switch polarity at each data bit boundary. Accordingly, because the value of each data bit is determined by whether there is a transition at the center of a bit or not, the actual polarity of the bit stream signal is irrelevant. There are only three valid symbols in a biphase mark bit stream: 1UI, 2UI and 3UI, where "UI" denotes "unit interval." As illustrated by FIG. 2, a biphase encoding block consists of 192 frames, with each frame including two sub-frames. Every sub-frame consists of a preamble part and a channel data part. Each preamble part contains two biphase mark encoding violations, as illustrated by TABLE 1. There are three types of preambles: X, Y and Z. Sub-frame 2 always begins with a Y preamble and sub-frame 1 almost always begins with an X preamble, with an exception that every 192 frames, the X preamble in sub-frame 1 is replaced with a Z preamble, which indicates a block start (i.e., start of Frame 0).

TABLE 1

| PRECEDING STATE | BI-PHASE PATTERNS | | |
|---|---|---|---|
| PREAMBLE | 0 | 1 | CHANNEL |
| X | 11100010 | 00011101 | CHANNEL 1 |
| Y | 11100100 | 00011011 | CHANNEL 2 |
| Z | 11101000 | 00010111 | CHANNEL 1 & BLOCK START |

As illustrated by FIG. 3, a conventional clock recovery circuit 10 may utilize a phase-locked loop (PLL) integrated circuit (digital or analog) to generate a recovered biphase clock that tracks to a biphase mark encoded data stream and to use this recovered clock to decode the encoded data stream into the original source data. An additional clock recovery circuit that utilizes a PLL integrated circuit is disclosed in U.S. Pat. No. 7,136,446 to Schmidt, entitled "Method and Apparatus for Data and Clock Recovery in a Biphase-Coded Data Signal." Techniques to recover clock signals from biphase mark bit streams are also disclosed in U.S. Pat. No. 7,310,390 to Bertram, entitled "Decoding Coded Data Streams," U.S. Pat. No. 6,768,433 to Toth et al., entitled "Method and System for Decoding Biphase-Mark Encoded Data," and US 2007/0047638 to Lam et al., entitled "System and Method for Decoding an Audio Signal."

SUMMARY OF THE INVENTION

Biphase mark signal receivers according to embodiments of the present invention include data and clock recovery circuits and methods of operating same. According to some of these embodiments, a data recovery circuit is provided with a coarse recovery stage and a fine recovery stage. The coarse recovery stage is configured to detect repeating occurrences of a first preamble (e.g., Y-preamble) within a biphase encoded data stream received by the data recovery circuit. The fine recovery stage is configured to generate a recovered data stream, in response to estimating a plurality of timing decision points (e.g., 3UI, 2UI and 1UI) from the repeating occurrences of the first preamble detected by the coarse recovery stage. According to these embodiments of the invention, the biphase encoded data stream encodes a plurality of distinct preambles (e.g., X, Y and Z preambles) within a multi-frame block of the biphase encoded data, and the first preamble is a preamble having a unique characteristic relative to all other preambles within the plurality of distinct preambles. For example, the first preamble may be a Y-preamble having only a single 1UI bit pattern therein, where "UI" designates unit interval. In particular, the Y-preamble may be detected by evaluating the biphase encoded data stream to identify a 1UI bit pattern therein that extends between an immediately preceding non-1UI bit pattern and an immediately following non-1UI bit pattern. This non-1UI bit pattern may be a 2UI bit pattern.

According to further aspects of these embodiments of the invention, the fine recovery stage is configured to measure a duration of a 128UI associated with the biphase encoded data stream from consecutive occurrences of the first preamble detected by the coarse recovery stage. The fine recovery stage may also be configured to estimate 3UI, 2UI and 1UI as the timing decision points, from the measured duration of the 128UI associated with the biphase encoded data stream.

The data recovery circuit may also include an edge detector responsive to the biphase encoded data stream. This edge detector is configured to generate a sequence of pulses in response to detecting consecutive edges of the biphase encoded data stream, using a relatively high frequency clock signal to accurately sample the biphase encoded data stream. This clock signal may be asynchronously timed relative to biphase encoded data stream. The fine recovery stage may also include a stream recovery circuit. This stream recovery circuit is configured to generate a recovered biphase encoded data stream and a recovered biphase clock from the sequence of pulses generated by the edge detector and the timing decision points (e.g., 3UI, 2UI and 1UI decision points).

According to further embodiments of the invention, a data recovery circuit is provided with a preamble detector and a unit interval measurement circuit. The preamble detector is configured to identify repeating occurrences of a first preamble within a first biphase encoded data stream and the unit interval measurement circuit is configured to measure a duration of a frame of data within the first biphase encoded data stream from the repeating occurrences of the first preamble identified by said preamble detector. A decision point estimation circuit and a stream recovery circuit are also provided. The decision point estimation circuit is configured to generate a plurality of timing decision points from the measured duration of the frame of data. The stream recovery circuit is configured to generate a second biphase encoded data stream and a corresponding biphase clock using the plurality of timing decision points to decode a sequence of pulses that encode edges of the first biphase encoded data stream. This sequence of pulses asynchronously encodes edges of the first biphase encoded data stream. A biphase decoder may also be provided to decode the sequence of pulses into a binary data stream that is synchronized with the biphase clock.

Still further embodiments of the invention include a clock recovery method. This clock recovery method may include generating a sequence of pulses that encode timing of low-to-high and high-to-low edges of a first biphase encoded data stream. A duration of a frame of data within the first biphase encoded data stream may then be measured, in response to detecting an occurrence of at least two consecutive and equivalent sub-frame preambles encoded within the sequence of pulses. A plurality of timing decision points are then estimated from the measured duration of the frame of data. A second biphase encoded data stream and a corresponding biphase clock are then recovered using the estimated plurality of timing decision points to decode the sequence of pulses. This second biphase encoded data stream is then decoded into binary data stream that is synchronized with the recovered biphase clock.

DETAILED DESCRIPTION OF PREFERRED EMBODIMENTS

Figure 1:
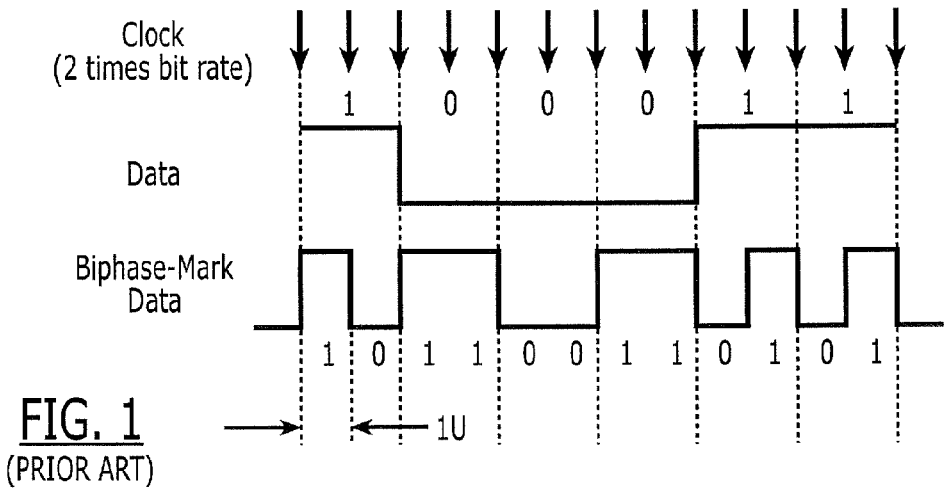
FIG. 1 is a timing diagram that illustrates a conventional biphase mark encoding format associated with a sample data stream, which is synchronized with a clock signal having a frequency that is twice a frequency of the sample data stream.
Figure 2:
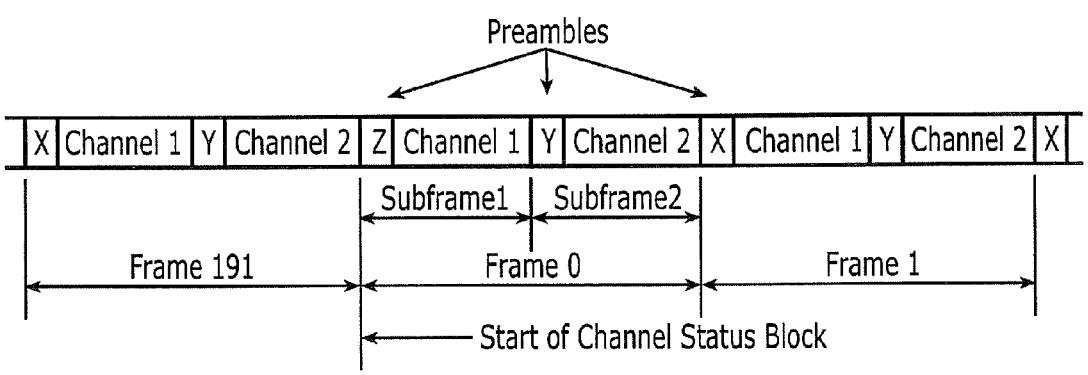
FIG. 2 is a timing diagram that illustrates a structure of a biphase encoding block having 192 frames, according to the prior art.
Figure 3:
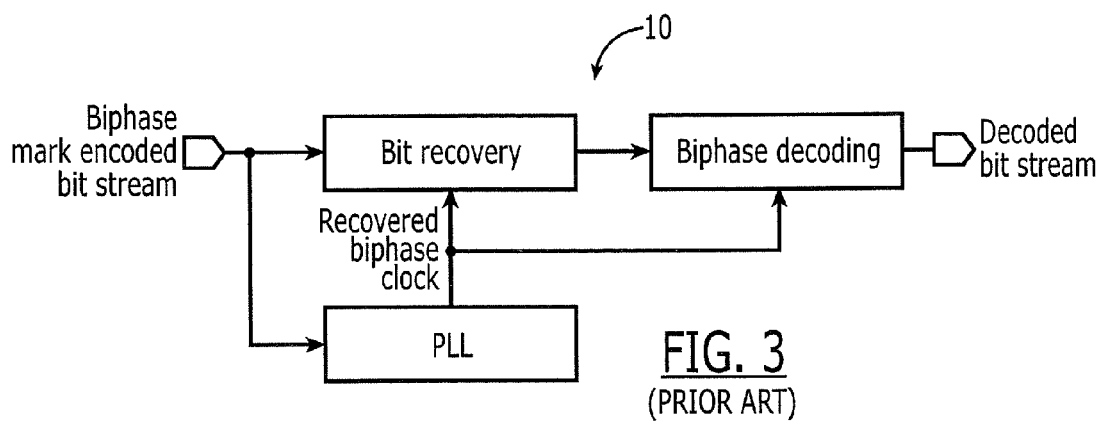
FIG. 3 is a block diagram of a conventional clock recovery circuit that utilizes a phase-locked loop to control timing of data recovery from a biphase encoded bit stream.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals; and each expression described herein includes its boolean and complementary equivalent.

Figure 4A:
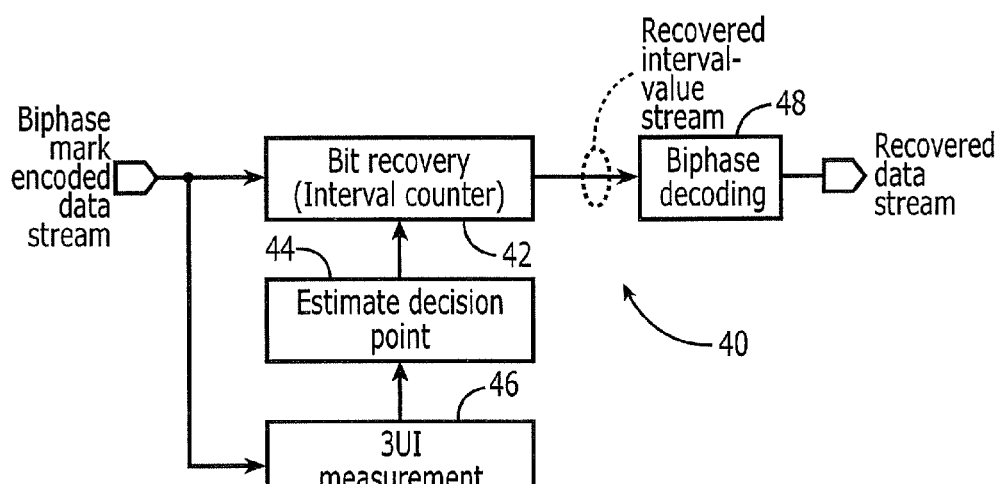
FIG. 4A is a block diagram of a biphase data recovery circuit according to an embodiment of the present invention.
Figure 4B:
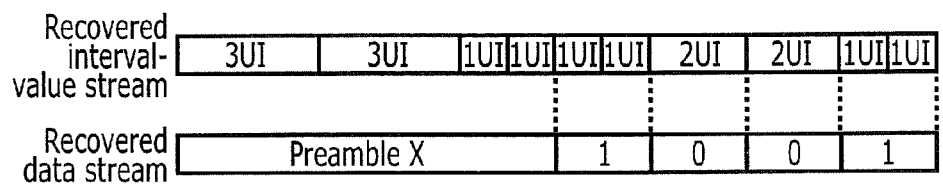
FIG. 4B is a timing diagram that illustrates a recovered biphase stream and a recovered data stream generated by the recovery circuit of FIG. 4A.

FIG. 4A is a block diagram of a biphase data recovery circuit 40 according to a first embodiment of the present invention. As illustrated, the biphase data recovery circuit 40 includes a bit recovery circuit 42 that generates a recovered biphase data stream (e.g., an interval value stream) at an output thereof, in response to a biphase mark encoded data stream received at an input thereof. This recovered biphase data stream is provided to a biphase decoding circuit 48, which generates a recovered data stream at an output thereof. This recovered data stream is asynchronously timed relative to the biphase encoded data stream received by the data recovery circuit 40. Operations performed by the biphase decoding circuit 48 may be conventional. As illustrated by the timing diagram of FIG. 4B, the biphase decoding circuit 48 may convert the recovered biphase data stream having a plurality of distinct unit interval transitions (e.g., 3UI, 2UI and 1UI) into a serial data stream that accurately reproduces the timing of each preamble (e.g., preamble X, Y and Z) and each valid data bit (1 or 0) from each pair of 1UI edges (representing logic 1) or each 2UI edge (representing logic 0).

The data recovery circuit 40 also includes a 3UI measurement circuit 46, which is responsive to the biphase encoded data stream. This 3UI measurement circuit 46 calculates a duration of a longest 3UI within the biphase encoded data stream by sampling the stream at a relatively high rate over a period of at least 60 consecutive edges, using a sampling clock having a relatively high frequency (e.g., greater than four (4) times the UI rate, where "UI rate" represents the maximum frequency of an audio signal being sampled), compared to a frequency of the biphase encoded data stream.

As will be understood by those skilled in the art, each preamble (X, Y or Z) within the biphase encoded data stream (e.g., SPDIF stream) includes four (4) edge transitions. Moreover, each 28-bit data sub-frame within the biphase encoded data stream includes a minimum of 28 edges (for the case where all data bits within the sub-frame equal "0") and a maximum of 56 edges (for the case where all data bits within the sub-frame equal "1"). This means that within any group of 60 (56+4) consecutive edges of the biphase encoded data stream, there will be at least one preamble containing at least one 3UI therein. Accordingly, the 3UI measurement circuit 46 may repeatedly evaluate groups of 60 consecutive edges within the biphase encoded data stream to measure a duration of longest unit interval (i.e., 3UI) within a respective group of edges. From this identified duration, three timing decision points (e.g., 3UI, 2UI and 1UI) may be estimated by a decision point estimation circuit 44 and used by the recovery circuit 42 to generate a recovered biphase data stream. In particular, each 1UI within the biphase encoded data stream may be detected by the recovery circuit 42 if a corresponding duration (between consecutive edges) is in the following range: $(1/6)(3UI) \leq 1UI \leq 1/2(3UI)$, where 3UI is the measured duration. Similarly, each 2UI within the biphase encoded data stream may be detected if a corresponding duration (between consecutive edges) is in the following range: $(1/2)(3UI) \leq 2UI \leq 5/6(3UI)$, where 3UI is the measured duration. Finally, each 3UI within the biphase encoded data stream may be detected if a corresponding duration (between consecutive edges) is in the following range: (⅚)(3UI)≦3UI, where 3UI is the measured duration.

Figure 5A:
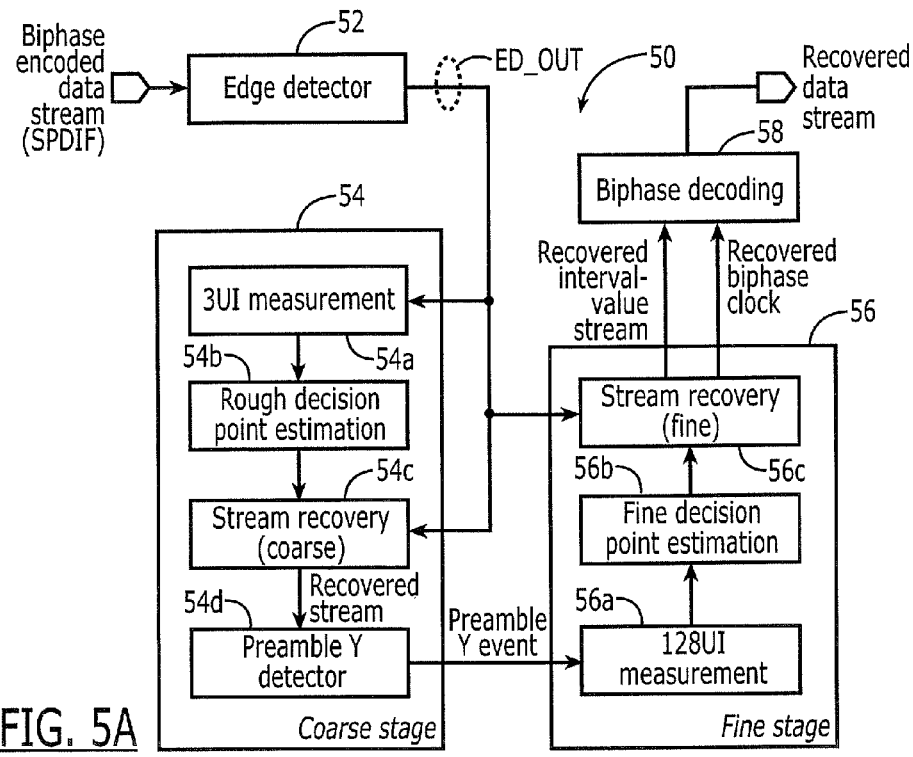
FIG. 5A is a block diagram of a biphase clock and data recovery circuit according to another embodiment of the present invention.

FIG. 5A is a block diagram of a biphase clock and data recovery circuit 50 according to another embodiment of the present invention. This recovery circuit 50 includes an edge detector 52, a coarse recovery stage 54, a fine recovery stage 56 and a biphase decoder 58, connected as illustrated. The illustrated embodiment of the coarse recovery stage 54 includes a 3UI measurement circuit 54a, a rough decision point estimation circuit 54b, a coarse stream recovery circuit 54c and a preamble detector 54d. The illustrated embodiment of the fine recovery stage 56 includes a 128UI measurement circuit 56a, a fine decision point estimation circuit 56b and a fine stream recovery circuit 56c.

Figure 5B:
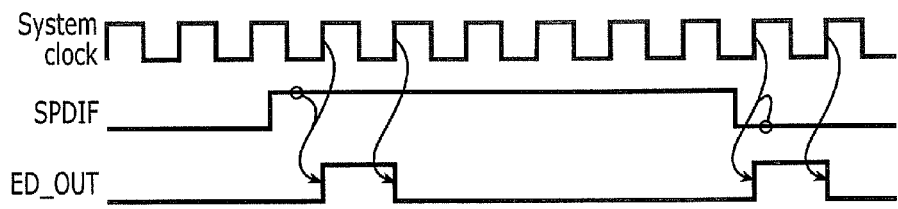
FIG. 5B is a timing diagram that illustrates an edge detector output signal generated by the edge detector of FIG. 5A.

As illustrated by the timing diagram of FIG. 5B, the edge detector 52, which is configured to receive a biphase encoded data stream (e.g., an SPDIF formatted stream), operates in-sync with an internal system clock having a sufficiently high frequency to thereby accurately sample the incoming biphase encoded data stream. The edge detector 52 also generates a sequence of pulses (e.g., logic 1 pulse train) at an output (ED_OUT) thereof. The edge detector 52 operates so that each leading edge of a pulse closely approximates the timing of a corresponding low-to-high or high-to-low edge transition within the biphase encoded data stream. The output ED_OUT of the edge detector 52 is provided as an input to the 3UI measurement circuit 54a and an input to the coarse stream recovery circuit 54c, as illustrated.

Figure 5C:
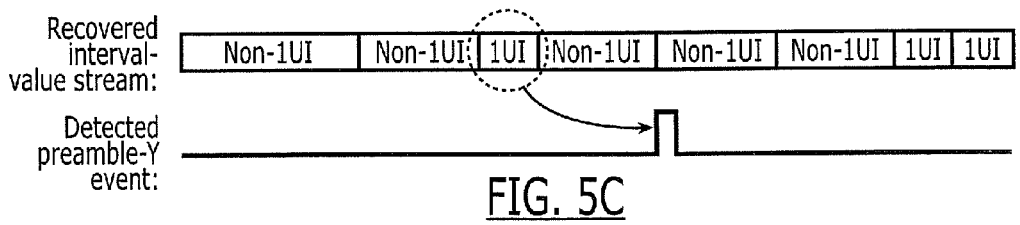
FIG. 5C is a timing diagram that illustrates operation of the preamble-Y detector of FIG. 5A.

The 3UI measurement circuit 54a performs similar operations to those described above with respect to the 3UI measurement circuit 46 of FIG. 4A. Thus, the 3UI measurement circuit 54a may repeatedly evaluate groups of 60 consecutive pulses from the edge detector 52 to measure a duration of longest unit interval (i.e., 3UI) within a respective group of pulses. From this identified duration, a coarse 1UI decision point (⅓(3UI)) may be estimated by the rough decision point estimation circuit 54b. As illustrated by the timing diagram of FIG. 5C, the estimated "coarse" 1UI decision point is used by the coarse stream recovery circuit 54c to determine whether the pulse stream generated at the output ED_OUT of the edge detector 52 includes 1UI intervals or non-1UI intervals (i.e., 2UI or 3UI intervals). In particular, the coarse stream recovery circuit 54c generates a recovered interval-value stream that delineates between 1UI and non-1UI intervals within the output ED_OUT. Moreover, because only the Y-preamble within each frame of the biphase encoded data stream includes a sequence of a 1UI interval between two immediately adjacent non-1UI intervals (before and after), the preamble detector 54d can accurately detect each Y-preamble event within the output ED_OUT of the edge detector 52 and, therefore, indirectly detect each Y-preamble event within the biphase encoded data stream received by the data recovery circuit 50. This unique characteristic of the Y-preamble relative to the X-preamble and the Z-preamble is highlighted by TABLE 2.

TABLE 2

| | | | | | | | | |
|---|---|---|---|---|---|---|---|---|
| SEQUENCE DETECTED BY COARSE STREAM RECOVERY CIRCUIT 54C | NON-1UI | | | NON-1UI | | | 1UI | 1UI |
| PREAMBLE-X | 1 | 1 | 1 | 0 | 0 | 0 | 1 | 0 |
| SEQUENCE DETECTED BY COARSE STREAM RECOVERY CIRCUIT 54C | NON-1UI | | 1UI | 1UI | | NON-1UI | | |

TABLE 2-continued

| | | | | | | | | |
|---|---|---|---|---|---|---|---|---|
| PREAMBLE-Z | 1 | 1 | 1 | 0 | 1 | 0 | 0 | 0 |
| SEQUENCE DETECTED BY COARSE STREAM RECOVERY CIRCUIT 54C | NON-1UI | | | NON-1UI | | | 1UI | NON-1UI |
| PREAMBLE-Y | 1 | 1 | 1 | 0 | 0 | 1 | 0 | 0 |

The fine recovery stage 56 is responsive to an output of the coarse recovery stage 54. In particular, the fine recovery stage 56 includes a 128UI measurement circuit 56a responsive to an output of the preamble detector 54d. The 128UI measurement circuit 56a recognizes that each Y-preamble event is spaced in time from an immediately prior Y-preamble event by two consecutive sub-frames of the biphase encoded data stream, with each sub-frame of the encoded data stream including 4 preamble bits and 28 data bits (i.e., 32 bits or 64UI) and each frame spanning 128UI. This relationship is illustrated by the timing diagram of FIG. 5D. The fine decision point estimation circuit 56b calculates highly accurate 3UI, 2UI and 1UI timing decision points from the duration of the measured 128UI, because any measurement error associated with the 128UI measurement is essentially divided by 128, 64 or 43 when the 1UI, 2UI and 3UI intervals are determined.

Figures 5D, 5E:
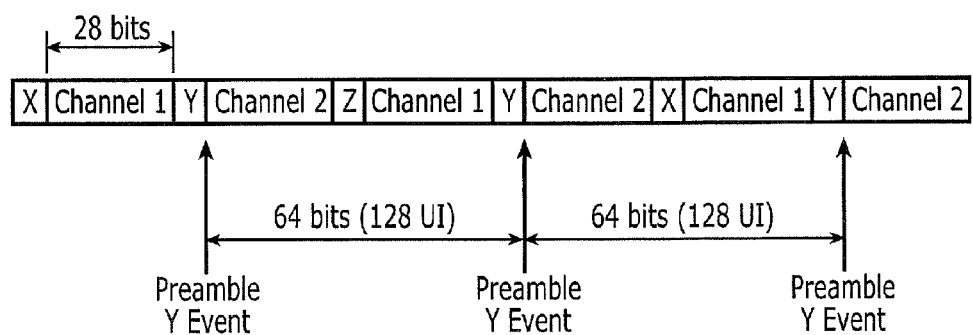
FIG. 5D is a timing diagram that illustrates how a 128 unit interval can be determined from consecutive preamble Y events detected by the preamble-Y detector of FIG. 5A.
FIG. 5E is a timing diagram that illustrates a relationship between a recovered biphase encoded stream and a recovered data stream generated by the biphase clock and data recovery circuit of FIG. 5A.

As illustrated by FIG. 5A and the timing diagram of FIG. 5E, these accurate 3UI, 2UI and 1UI decision points are used by the fine stream recovery circuit 56c to generate a recovered biphase data stream having 3UI, 2UI and 1UI timing intervals. Conventional techniques may also be used by the recovery circuit 56c to generate a recovered biphase clock from the recovered biphase data stream. The recovered biphase data stream and the recovered biphase clock are provided to the biphase decoding circuit 58, which generates a recovered data stream at an output thereof. In particular, as further illustrated by the timing diagram of FIG. 5E, the biphase decoding circuit 58 may convert the recovered biphase data stream having a plurality of distinct unit interval transitions (e.g., 3UI, 2UI and 1UI) into a serial bit stream that accurately reproduces the timing of each preamble (e.g., preamble X, Y and Z) and each valid data bit (1 or 0) from each pair of 1UI edges (representing logic 1) or each 2UI edge (representing logic 0).

Figure 6:
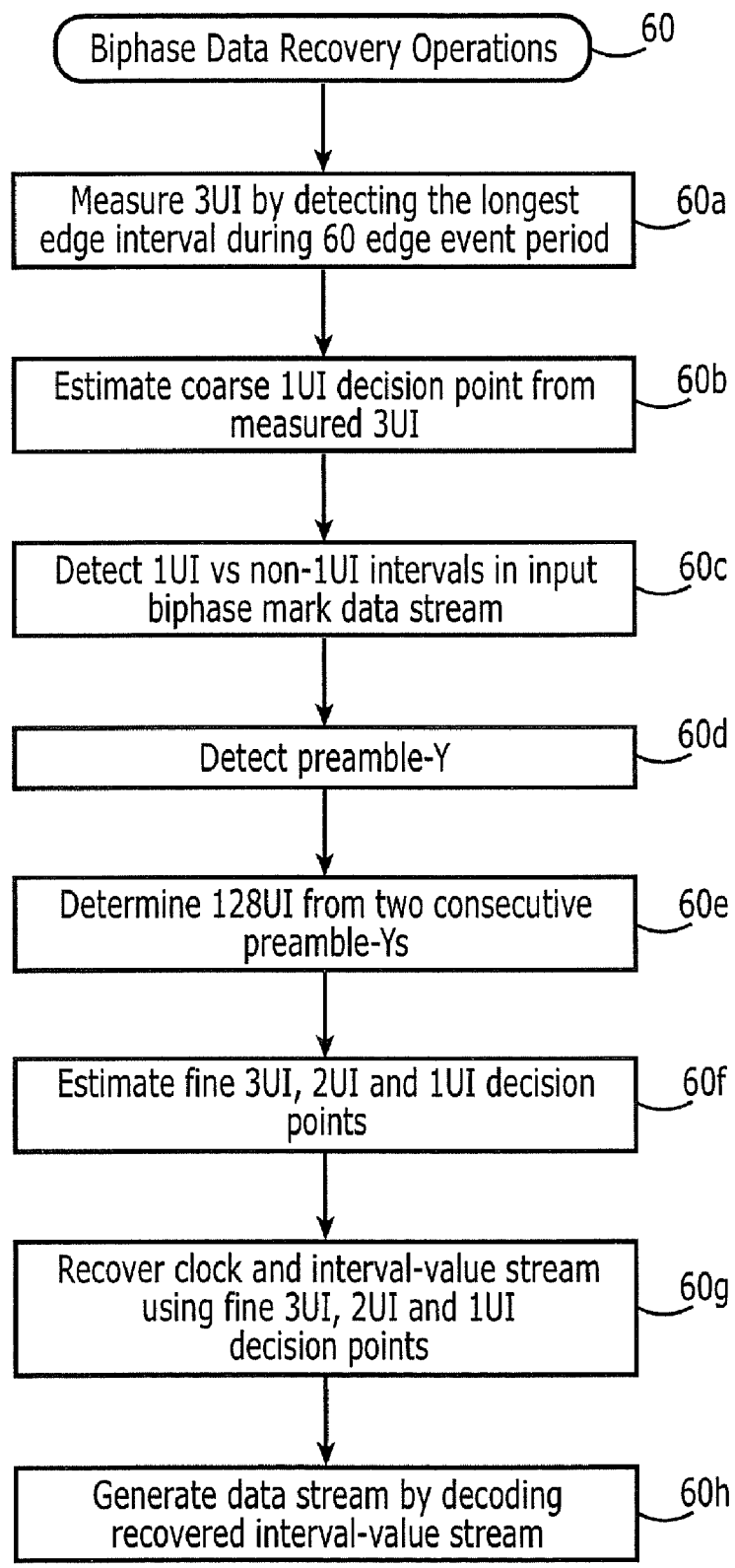
FIG. 6 is a flow diagram of operations that illustrate operations performed by the biphase clock and data recovery circuit of FIG. 5A.

Additional embodiments of the invention include methods of performing data and clock recovery operations on biphase data streams. For example, as illustrated by FIG. 6, data recovery operations 60 according to some embodiments of the invention include measuring a 3UI time interval associated with a biphase encoded data stream, Block 60a, and then estimating a 1UI decision point from the measured 3UI time interval, Block 60b. Then, as illustrated by Block 60c and described above with respect to FIGS. 5A and 5C, an interval value stream (having 1UI or non-1UI (2UI or 3UI) intervals) is then recovered, Block 60c. The interval value stream is then evaluated to identify the timing of consecutive Y-preambles therein (i.e., detect unique pattern: . . . , non-1UI, 1UI, non-1UI, . . . ), Block 60d. The detection of consecutive Y-preambles enables the measurement of a duration of a 128UI, Block 60e, as described above with respect to the fine recovery stage 56. The measurement of 128UI is then used by the fine decision point estimation circuit 56b to accurately determine 3UI, 2UI and 1UI decision points, Block 60f. These three decision points can then be used to recover an interval-value stream (with 3UI, 2UI and 1UI intervals) directly from an encoded pulse stream (e.g., ED_OUT), Block 60g, and then decode the interval-value stream into a data stream, Block 60h.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A data recovery circuit, comprising:
a coarse recovery stage configured to detect repeating occurrences of a first preamble within a biphase encoded data stream received by the data recovery circuit; and
a fine recovery stage configured to generate a recovered data stream, in response to estimating a plurality of timing decision points from the repeating occurrences of the first preamble detected by said coarse recovery stage.

2. The data recovery circuit of claim 1, wherein the biphase encoded data stream encodes a plurality of distinct preambles within a multi-frame block of the biphase encoded data; and wherein the first preamble is a preamble having a unique characteristic relative to all other preambles within the plurality of distinct preambles.

3. The data recovery circuit of claim 2, wherein the first preamble is a preamble having only a single 1UI bit pattern therein, where "UI" designates unit interval.

4. The data recovery circuit of claim 3, wherein the first preamble is a Y-preamble.

5. The data recovery circuit of claim 3, wherein said coarse recovery stage is configured to detect the first preamble within the biphase encoded data stream by detecting the 1UI bit pattern therein that extends between an immediately preceding non-1UI bit pattern and an immediately following non-1UI bit pattern.

6. The data recovery circuit of claim 3, wherein said coarse recovery stage is configured to detect the first preamble within the biphase encoded data stream by detecting the 1UI bit pattern therein that extends between an immediately preceding 2UI bit pattern and an immediately following 2UI bit pattern.

7. The data recovery circuit of claim 1, wherein said fine recovery stage is further configured to measure a duration of a 128UI associated with the biphase encoded data stream from consecutive occurrences of the first preamble detected by said coarse recovery stage, where "UI" designates a unit interval.

8. The data recovery circuit of claim 7, wherein said fine recovery stage is further configured to estimate 3UI, 2UI and 1UI as the timing decision points, from the measured duration of the 128UI associated with the biphase encoded data stream.

9. The data recovery circuit of claim 5, wherein said fine recovery stage is further configured to measure a duration of a 128UI associated with the biphase encoded data stream from consecutive occurrences of the first preamble detected by said coarse recovery stage.

10. The data recovery circuit of claim 9, wherein said fine recovery stage is further configured to estimate 3UI, 2UI and 1UI as the timing decision points, from the measured duration of the 128UI associated with the biphase encoded data stream.

11. The data recovery circuit of claim 10, further comprising an edge detector responsive to the biphase encoded data stream, said edge detector configured to generate a sequence of pulses in response to detecting consecutive edges of the biphase encoded data stream, using a clock signal to synchronize sampling of the biphase encoded data stream.

12. The data recovery circuit of claim 11, wherein the clock signal is asynchronously timed relative to biphase encoded data stream.

13. The data recovery circuit of claim 11, wherein said fine recovery stage comprises a stream recovery circuit configured to generate a recovered biphase encoded data stream from the sequence of pulses generated by said edge detector and the timing decision points.

14. The data recovery circuit of claim 11, wherein said fine recovery stage comprises a stream recovery circuit configured to generate a recovered biphase encoded data stream and a recovered biphase clock from the sequence of pulses generated by said edge detector and the timing decision points.

15. A data recovery circuit, comprising:
a preamble detector configured to identify repeating occurrences of a first preamble within a first biphase encoded data stream; and
a unit interval measurement circuit configured to measure a duration of a frame of data within the first biphase encoded data stream from the repeating occurrences of the first preamble identified by said preamble detector.

16. The data recovery circuit of claim 15, further comprising:
a decision point estimation circuit configured to generate a plurality of timing decision points from the measured duration of the frame of data; and
a stream recovery circuit configured to generate a second biphase encoded data stream and a corresponding biphase clock using the plurality of timing decision points to decode a sequence of pulses that encode edges of the first biphase encoded data stream.

17. The data recovery circuit of claim 16, wherein the sequence of pulses asynchronously encodes edges of the first biphase encoded data stream.

18. The data recovery circuit of claim 17, further comprising a biphase decoder configured to decode the sequence of pulses into a binary data stream that is synchronized with the biphase clock.

19. A data and clock recovery method, comprising:
generating a sequence of pulses that encode timing of low-to-high and high-to-low edges of a first biphase encoded data stream;
measuring a duration of a frame of data within the first biphase encoded data stream, in response to detecting an occurrence of at least two consecutive and equivalent sub-frame preambles encoded within the sequence of pulses;
estimating a plurality of timing decision points from the measured duration of the frame of data; and
recovering a second biphase encoded data stream and a corresponding biphase clock using the estimated plurality of timing decision points to decode the sequence of pulses.

20. The method of claim 19, further comprising:
decoding the second biphase encoded data stream into binary data stream that is synchronized with the recovered biphase clock.

* * * * *